US006381197B1

(12) United States Patent
Savord et al.

(10) Patent No.: US 6,381,197 B1
(45) Date of Patent: Apr. 30, 2002

(54) APERTURE CONTROL AND APODIZATION IN A MICRO-MACHINED ULTRASONIC TRANSDUCER

(76) Inventors: Bernard J Savord, 243 Highland Rd., Andover, MA (US) 01810; William J Ossmann, 28 Lothrop Rd., Acton, MA (US) 01720; Jie Chen, 99 Meadowood Rd., North Andover, MA (US) 01845; Michael P Anthony, 38 Chestnut St., Andover, MA (US) 01810; Turuvekere R Gururaja, Flat A, 4/F Woodbury Court No. 10, Parkvale Drive Discovery Bay (HK); Stephen M Grenon, 6318 Acorn Ridge Trail, Hillsborough, NC (US) 27278

(*) Notice: Subject to any disclaimer, the term of this patent is extended or adjusted under 35 U.S.C. 154(b) by 0 days.

(21) Appl. No.: 09/521,393

(22) Filed: Mar. 8, 2000

Related U.S. Application Data

(60) Provisional application No. 60/133,638, filed on May 11, 1999.

(51) Int. Cl.[7] .............................................. H04R 17/00
(52) U.S. Cl. ....................................................... 367/178
(58) Field of Search ................................. 367/153, 163, 367/165, 170, 173, 174, 178, 181, 191; 122/50

(56) References Cited

U.S. PATENT DOCUMENTS

| 5,619,476 | A |   | 4/1997  | Haller et al. ................. 367/181 |
|-----------|---|---|---------|----------------------------------------|
| 5,639,423 | A | * | 6/1997  | Northrup et al. .............. 122/50   |
| 5,870,351 | A |   | 2/1999  | Ladabaum et al. ......... 367/163      |
| 5,894,452 | A |   | 4/1999  | Ladabaum et al. ......... 367/163      |
| 5,982,709 | A |   | 11/1999 | Ladabaum et al. ......... 367/170      |
| 6,004,832 | A |   | 12/1999 | Haller et al. .................. 438/50 |

* cited by examiner

Primary Examiner—Daniel T. Pihulic

(57) ABSTRACT

A micro-machined ultrasonic transducer (MUT) having aperture, elevation and apodization controlled by apparatus located on the same substrate as the transducer, or by bias voltage control applied to MUT elements, allows for an efficient and compact ultrasonic probe. The control apparatus may take the form of field effect transistors (FET's), micro-machined relays, or doped regions on the substrate, or any other apparatus that may be located on the same substrate as that of the transducer, or by bias voltage sources connected to the MUT elements.

21 Claims, 10 Drawing Sheets

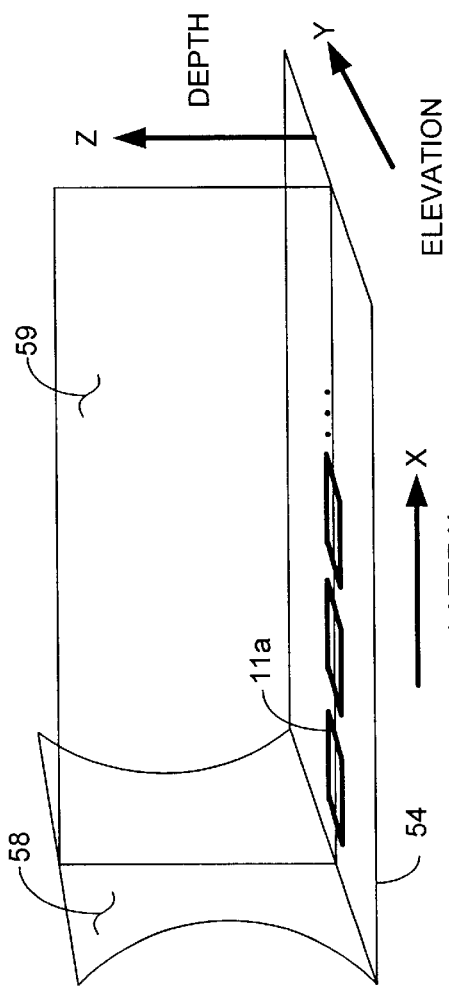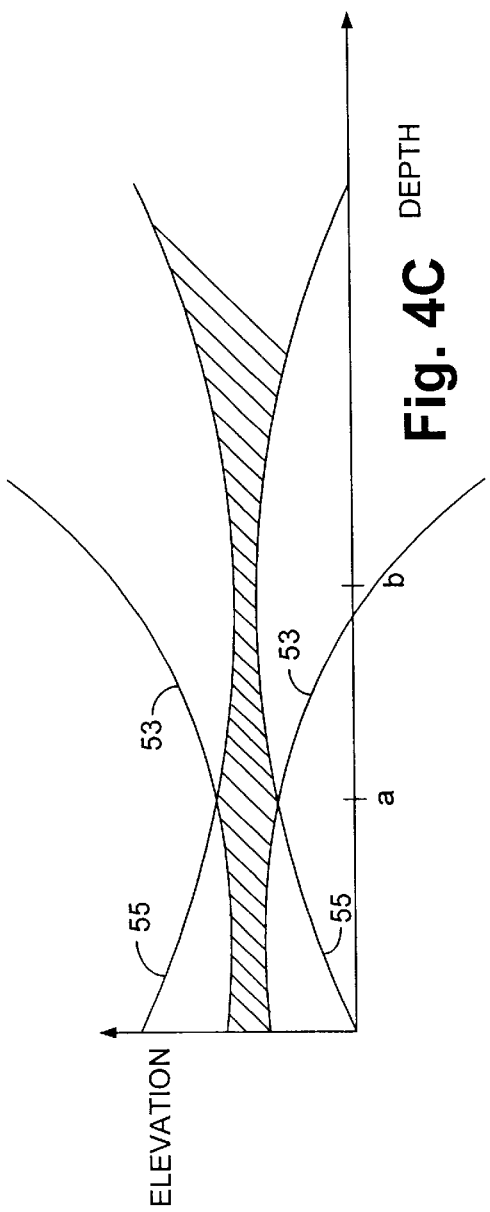

APERTURE CONTROL AND APODIZATION IN A MICRO-MACHINED ULTRASONIC TRANSDUCER

CROSS REFERENCE TO RELATED APPLICATION

This application claims priority to and the benefit of the filing date of U.S. Provisional patent application Ser. No. 60/133,638, entitled "APERTURE CONTROL AND APODIZATION IN A MICROMACHINED ULTRASONIC TRANSDUCER," filed on May 11, 1999.

TECHNICAL FIELD

The present invention relates generally to ultrasonic transducers, and, more particularly, to aperture control and apodization in a micro-machined ultrasonic transducer.

BACKGROUND OF THE INVENTION

Ultrasonic transducers have been available for quite some time and are useful for interrogating solids, liquids and gasses. One particular use for ultrasonic transducers has been in the area of medical imaging. Ultrasonic transducers are typically formed of piezoelectric elements. The elements typically are made of material such as lead zirconate titanate (abbreviated as PZT), with a plurality of elements being arranged to form a transducer assembly. The transducer assembly is then further assembled into a housing possibly including control electronics, in the form of electronic circuit boards, the combination of which forms an ultrasonic probe. This ultrasonic probe, which may include acoustic matching layers between the surface of the PZT transducer element or elements and the probe body, may then be used to send and receive ultrasonic signals through body tissue.

One limitation of PZT devices is that the acoustic impedance is approximately 30–35 MRayls (kg/m$^2$s), while the acoustic impedance of the human body is approximately 1.5 MRayls. Because of this large impedance mismatch acoustic matching layers are needed to match the PZT impedance to the body impedance. Acoustic matching layers work using a ¼ wave resonance principle and are therefore narrow band devices, their presence thus reducing the available bandwidth of the PZT transducer. In order to achieve maximum resolution, it is desirable to operate at the highest possible frequency and the highest possible bandwidth.

In order to address the shortcomings of transducers made from piezo-electric materials, a micro-machined ultrasonic transducer (MUT), which is described in U.S. Pat. No. 5,619,476 to Haller, et al., has been developed. Micro-machined ultrasonic transducers address the shortcomings of PZT transducers by, among other attributes, being fabricated using semiconductor fabrication techniques on a silicon substrate. The MUT's are formed using known semiconductor manufacturing techniques resulting in a capacitive non-linear ultrasonic transducer that comprises, in essence, a flexible membrane supported around its edges over a silicon substrate. By applying contact material to the membrane, or a portion of the membrane, and to the silicon substrate and then by applying appropriate voltage signals to the contacts, the MUT may be energized such that an appropriate ultrasonic wave is produced. Similarly, with the application of a bias voltage, the membrane of the MUT may be used to generate receive ultrasonic signals by capturing reflected ultrasonic energy and transforming that energy into movement of the membrane, which then generates a receive signal. When imaging the human body, the membrane of the MUT moves freely with the imaging medium, thus eliminating the need for acoustic matching layers. Therefore, transducer bandwidth is greatly improved.

Another limitation of PZT transducers is that the apparatus required for switching the transducers within an array are bulky and consume valuable space. For example, in order to switch a PZT transducer array, a number of switching elements are typically provided on an electronic circuit assembly, the assembly integrated with the transducer array into a housing to form an ultrasonic probe. These probes tend to be large and bulky due, in large part, to the presence of the switching apparatus.

Therefore it would be desirable to have an ultrasonic transducer array in which little space is occupied by the switching apparatus.

SUMMARY OF THE INVENTION

The invention provides aperture control and apodization in a micro-machined ultrasonic transducer (MUT) by using switching apparatus located on the same substrate as the MUT.

In architecture, the present invention may be conceptualized as MUT array, comprising at least one MUT element, the MUT element including at least one MUT cell, the MUT cell formed on a substrate, and control means, located on the substrate and associated with the MUT element, for controlling the MUT array.

In another aspect, the present invention may be conceptualized as a MUT array, comprising at least one MUT element, the MUT element including at least one MUT cell, the MUT cell formed on a substrate, and control circuitry associated with the MUT element, the control circuitry configured to supply a bias voltage to the MUT element.

In yet another aspect, the invention may be conceptualized as a MUT array, comprising at least one MUT element, the MUT element including a plurality of MUT cells, the MUT cells having a variable gain, such that the gain of MUT cells located toward a center of the MUT element is greater than the gain of the MUT cells located toward a periphery of the MUT element.

The present invention may also be conceptualized as providing a method for controlling a MUT array, the MUT array including at least one MUT element formed on a substrate, the MUT element including at least one MUT cell, the method comprising the steps of: forming control means on the substrate, the control means associated with the MUT element, the control means formed on the substrate, and selectively energizing the MUT element in the array by activating the control means.

In another aspect, the invention may be conceptualized as providing a method for controlling a MUT array, the MUT array including at least one MUT element, each MUT element including a plurality of MUT cells, the method comprising the steps of: forming the MUT element on a substrate, and supplying a bias voltage to the MUT element in order to control an acoustical profile of the MUT element.

In yet another aspect, the invention may be conceptualized as providing a method for controlling a MUT array, the array including at least one MUT element, the MUT element including a plurality of MUT cells, the method comprising the steps of: varying a gain of each MUT cell such the gain of MUT cells located toward a center of the MUT element is greater than the gain of the MUT cells located toward a periphery of the MUT element.

BRIEF DESCRIPTION OF THE DRAWINGS

The present invention, as defined in the claims, can be better understood with reference to the following drawings.

The components within the drawings are not necessarily to scale relative to each other, emphasis instead being placed upon clearly illustrating the principles of the present invention.

FIG. 4B is a graphical representation illustrating the elevation beam profile of FIG. 4A;

FIG. 4C is a representation of the transducer array of FIG. 4B graphically representing elevation versus depth;

DETAILED DESCRIPTION OF THE PREFERRED EMBODIMENT

The invention to be described hereafter is applicable to MUT's excited by either analog or digital waveforms, and to MUT's fabricated on the same substrate with various switching and control apparatus.

Furthermore, for simplicity in the description to follow, only the principal elements of the MUT elements, MUT arrays and switching apparatus located on the same substrate as the MUT devices of the present invention will be illustrated.

Figure 1:
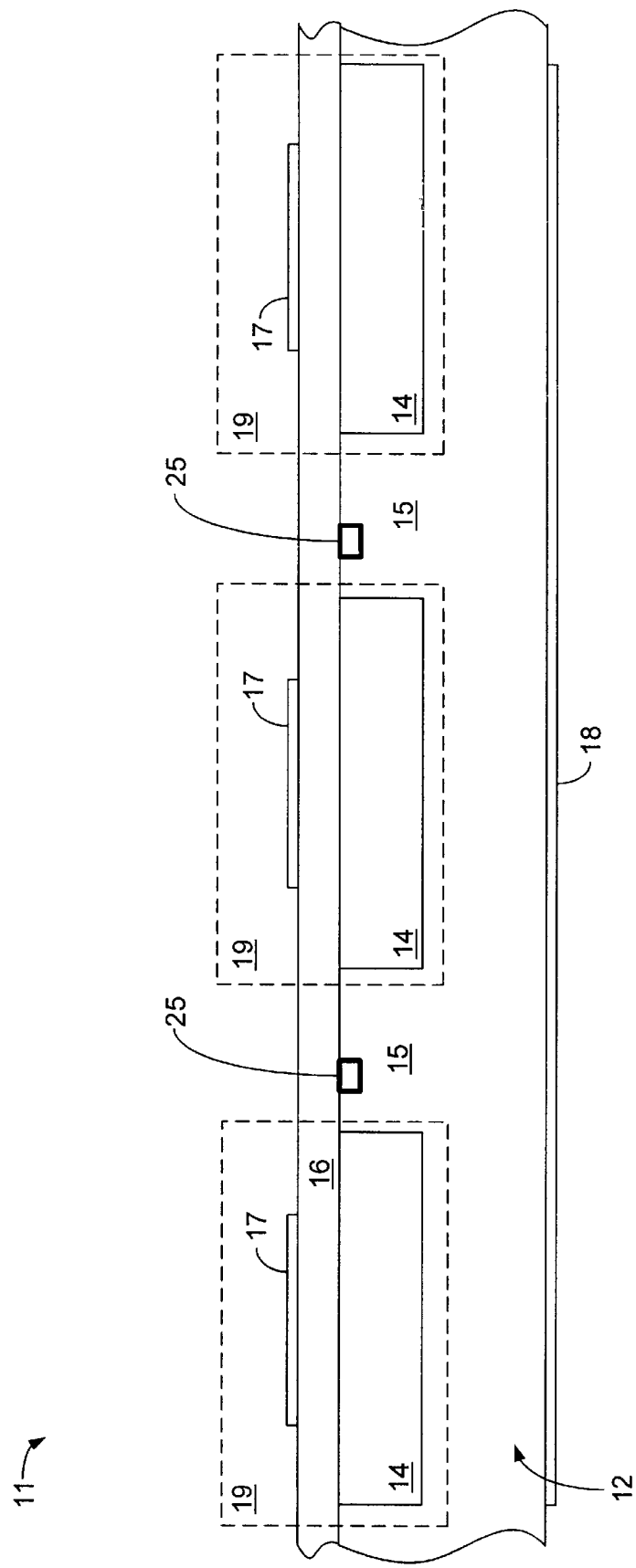
FIG. 1 is a simplified cross-sectional schematic view illustrating a MUT in accordance with the invention.

Turning now to the drawings, FIG. 1 is a simplified cross-sectional schematic view illustrating a MUT element 11 in accordance with the invention. MUT element 11 is comprised of a plurality of MUT cells 19, which may be arranged in a variety of configurations. In a particular embodiment of the invention, MUT cells 19 are formed over a substrate 12, which may be a semiconductor substrate such as silicon, and which may also form the support elements 15 for MUT membrane 16. Alternatively, support elements 15 may be of another material grown over substrate 12. MUT membrane 16, support elements 15 and substrate 12 define a gap 14, which may be exposed to ambient pressure or which may contain a vacuum, depending upon the application to which the MUT element 11 is directed. An electrode 18 is applied to one surface of substrate 12 and an electrode 17 is applied over membrane 16. When MUT cell 19 is used in a transmitting application, membrane 16 oscillates when excited by voltage applied to electrodes 17 and 18, thus producing an ultrasonic pressure wave. When MUT cell 19 is used in a receive application in which a bias voltage is applied, acoustic pressure impinging upon MUT membrane 16 causes MUT membrane 16 to oscillate and thus convert the acoustical energy into electrical energy, resulting in a receive signal being developed. The size of gap 14 determines the acoustic performance of the MUT cell 19.

A control apparatus 25 is also included with MUT element 11, in one aspect of the invention. Control apparatus 25 functions to provide aperture and apodization control and is integrated onto substrate 12 along with MUT cells 19. Typically, one control apparatus 25 is associated with each MUT element 11, however, a control apparatus 25 may be associated with each MUT cell 19.

Control apparatus 25 may take the form of switches, such as field effect transistors, formed on substrate 12 or may indeed include other switching techniques, such as but not limited to micro-machined relays. Control apparatus 25 may also take the form of biasing voltage used to excite MUT element 11 in a manner that provides control over the aperture (to be described with reference to FIGS. 2 and 3), elevation (to be described with reference to FIGS. 4, 5A and 5B) and apodization (to be described in detail with reference to FIGS. 5A and 5B) of the MUT element 11.

In accordance with one aspect of the invention, the control apparatus 25 is integrated onto the same substrate 12 as the MUT cells 19 and MUT element 11, thus eliminating the need for ancillary control electronics to be integrated with a transducer array (which is comprised of a plurality of MUT elements 11 and omitted from FIG. 1 for simplicity) at a later packaging step. Because the invention incorporates control means 25 into the MUT element 11, significant improvements in transducer control and actuation are possible. For example, transducer aperture, elevation and apodization may be efficiently controlled without the need for bulky and possibly unreliable external electronics.

Figure 2:
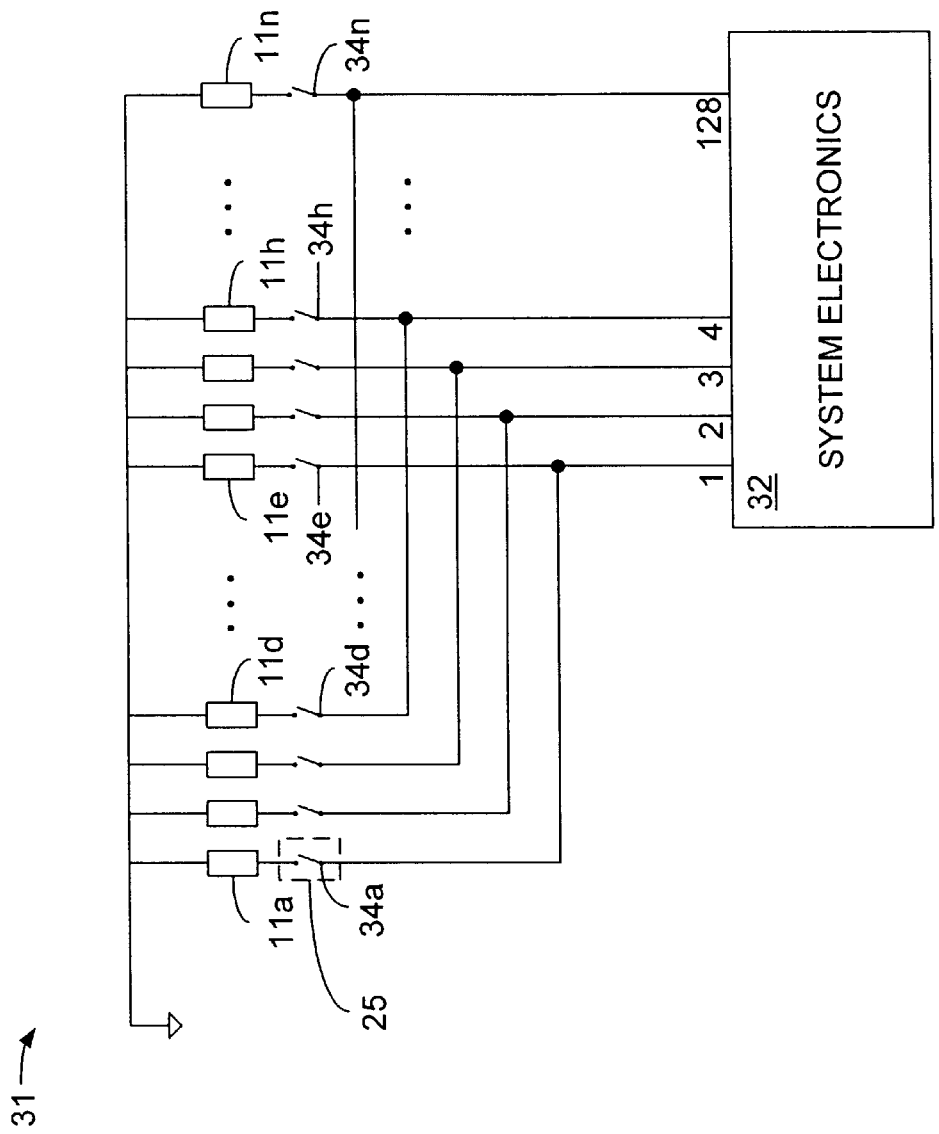
FIG. 2 is a schematic view illustrating a transducer array constructed in accordance with one aspect of the present invention.

FIG. 2 is a schematic view illustrating a transducer array 31 constructed in accordance with one aspect of the present invention. The transducer array 31 shown in FIG. 2 will be used to illustrate a technique of MUT aperture control known as tractor treading. Tractor treading allows control electronics to create a moving window of transducer elements in which a number of transducer elements (less than the whole) are active at any time, thus providing lateral aperture control. There are, in this example, 256 MUT elements 11 having 256 corresponding switches 34. It should be understood that in the foregoing discussion and all discussion to follow, that any number of MUT elements may form an array, and indeed that many different array configurations may be employed. For example, while a simple one dimensional array 31 is depicted herein, more complex multi-dimensional arrays may also benefit from the concepts of the invention. Each switch 34 is one possible implementation of control means 25 of FIG. 1. MUT elements 11 and associated switches 34 are formed on the same substrate (12 of FIG. 1), thereby allowing efficient aperture control.

As can be seen, system electronics 32 has 128 output signal lines, connecting to 256 transducer elements. For example, when system electronics output line 1 is made active, both switches 34a and 34e will be capable of energizing MUT element 11a or 11e. For example, in order to have an aperture window of 128 elements 11, the first 128 switches 34 will close thereby energizing the first 128 MUT elements 11. When switch 34e activates the $129^{th}$ MUT element 11, switch 34a would open thus deactivating MUT element 11a, and creating a moving window of 128 MUT elements 11. Typically, only 128 of the 256 MUT elements may be active at any time.

Switches 34 may be, for example, field effect transistors (FETs) that are formed on the same substrate 12 as MUT elements 11, or alternatively, switches 34 may be micromachined relays. It should be noted that control apparatus 25 may be any apparatus for selectively activating an associated MUT 11.

Because it is desirable to have a transducer array with as many elements as possible, tractor treading allows an economical number of electronic channels to control a relatively large transducer array. In accordance with the invention, transducer array 31 includes MUT elements 11 and switches 34 integrated onto the same semiconductor substrate 12.

Figure 3:
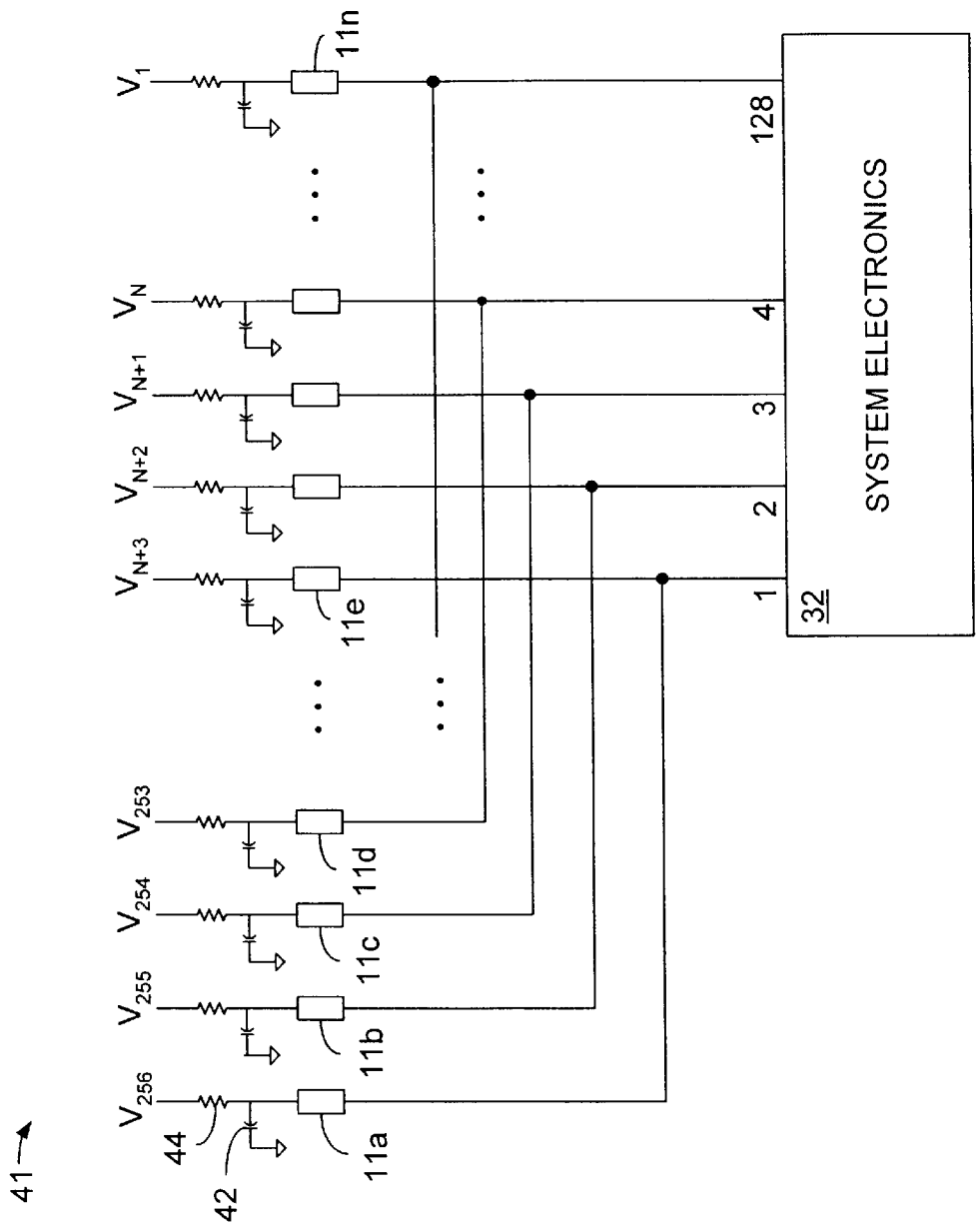
FIG. 3 is a schematic view illustrating a MUT transducer array in accordance with another aspect of the invention.

FIG. 3 is a schematic view illustrating a MUT transducer array 41 in accordance with another aspect of the invention. MUT transducer array 41 includes MUT elements 11 connected to system electronics 32 in similar fashion to that described with respect to FIG. 2. However, a bias voltage source, a resistor, and a capacitor are associated with each MUT element 11 instead of a switch and are used to control MUT element 11. Resistor 44 and capacitor 42 are shown as exemplar components and are associated with each MUT element 11 and may either reside on the same substrate (12 of FIG. 1) as MUT element 11, or may be separately integrated. In a departure to that described with respect to FIG. 2, MUT elements 11 of FIG. 3 are activated by bias voltage sources $V_1$–$V_{256}$. To illustrate, MUT element 11a and MUT element 11e are both connected to system electronics channel 1 and are also connected to $V_{256}$ and $V_{N+3}$, respectively. Connected between each MUT element and its bias voltage source is a de-coupling circuit comprising a capacitor and a resistor, the de-coupling circuit assuring that any high frequency ultrasound signals are grounded. In this manner, by controlling the bias voltage supplied by $V_1$–$V_{256}$ to each MUT element 11, the lateral aperture of transducer array 41 may be controlled by enabling the tractor treading as discussed above.

Figure 4A:
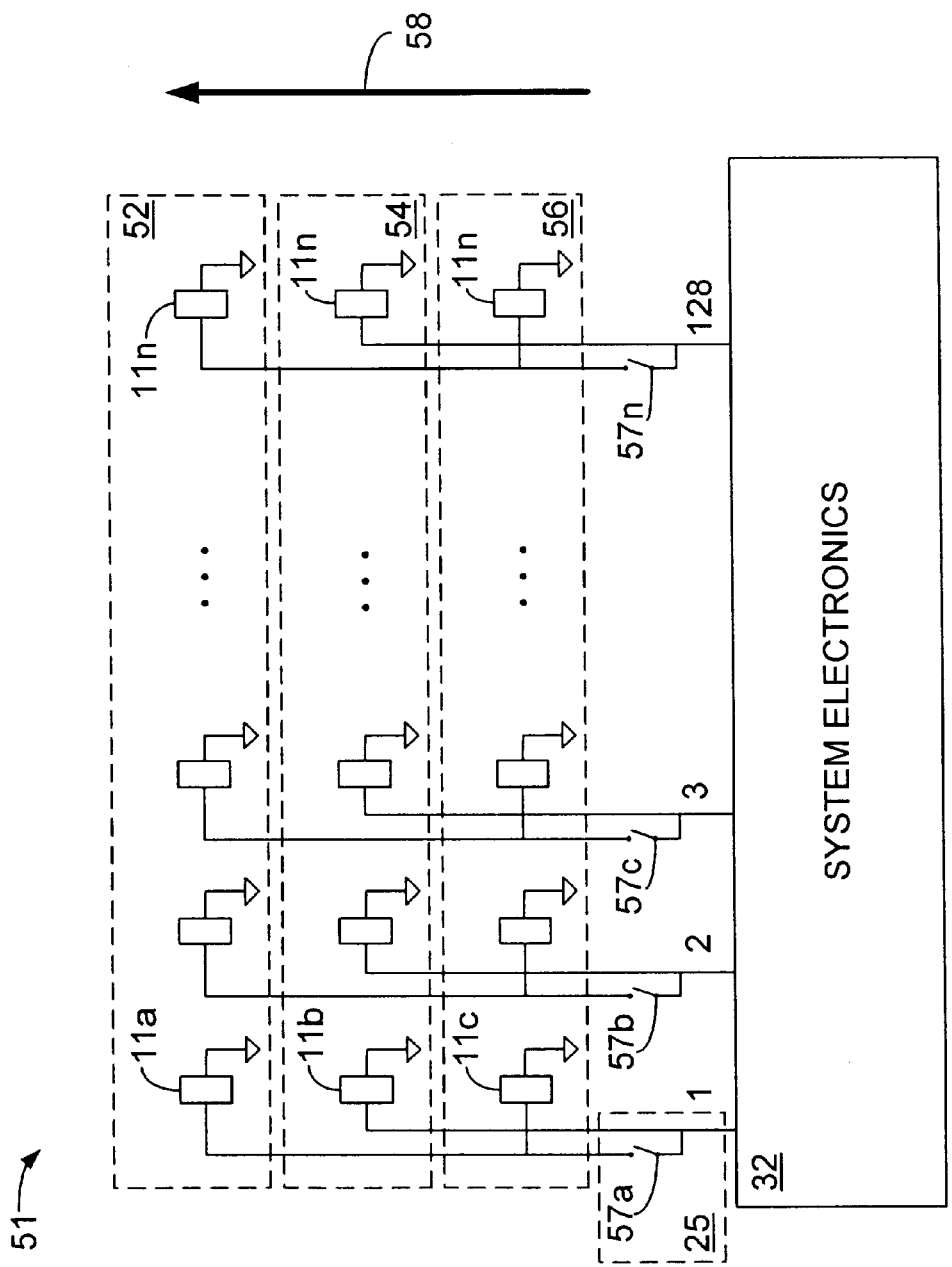
FIG. 4A is a schematic view illustrating another aspect of the invention in which elevation control is provided to a transducer array.

FIG. 4A is a schematic view illustrating another aspect of the invention in which elevation aperture control is provided to transducer array 51. Transducer array 51 includes transducer element rows 52, 54, and 56, each containing a plurality of MUT elements 11. In this illustration, there are 128 system electronics channels, and 128 MUT elements 11 within each transducer element row. The output of each system electronics 32 channel is directed to a switch 57. As can be seen, each switch 57 is configured to either apply the signal from system electronics 32 to a MUT element 11a in transducer element row 54, or to a MUT element 11b and MUT element 11c in both transducer element row 52 and transducer element row 56, respectively. Specifically, when switch 57 is in an open position, only MUT element 11a in transducer element row 54 is energized. Conversely, when switch 57 is in a closed position, all three MUT elements 11a, 11b and 11c in transducer element rows 52, 54 and 56, respectively, are energized. Typically, all three transducer element rows are energized when a deep image is desired. Only transducer element row 54 is energized when it is desired to image in close. These instances will be graphically illustrated with respect to FIGS. 4B and 4C. As stated above, any number of MUT elements may form an array, and indeed many different array configurations are possible.

In accordance with one aspect of the invention, switch 57 may be integrated on the same substrate (12 of FIG. 1) as MUT elements 11, and may be similar in design to that described with respect to FIGS. 1 and 2. The arrow 58 indicates the direction of increasing elevation.

FIG. 4B is a graphical representation illustrating the elevation beam profile of FIG. 4A. While transducer element row 54 is illustrated in FIG. 4B, the same analysis applies to transducer element rows 52 and 56. As can be seen in FIG. 4B, the image plane 59 orthogonally bisects transducer element row 54 and resides in the z direction denoting depth. MUT elements 11a are depicted in the lateral direction. Elevation plane 58 illustrates the ultrasonic signal emanating from transducer element row 54.

With reference now to FIG. 4C, shown is a representation of the transducer array of FIG. 4B graphically illustrating elevation versus depth. Curve 55 illustrates a condition in which all transceiver element rows 52, 54 and 56 of FIG. 4A are imaging. As can be seen, a wide field converges at a certain depth, b, into a narrow image field and then diverges. Alternatively, curve 53 illustrates a case in which only transducer element row 54 of FIG. 4A is active. As can be seen, a much narrower beam occurs at a shallower depth of interest than that of curve 55. In accordance with the present invention, it is desirable to maximize the depth of interest by starting a scan using a narrow beam (i.e., only transducer element row 54 of FIG. 4A) represented by curve 53, and once a certain depth of interest is reached (i.e., point a), then switch to activate transducer element rows 52, 54, and 56 in order to maximize the depth of interest. The cross-hatched area of FIG. 4C illustrates the maximized beam shape achieved through the operation of the invention.

Figure 5A:
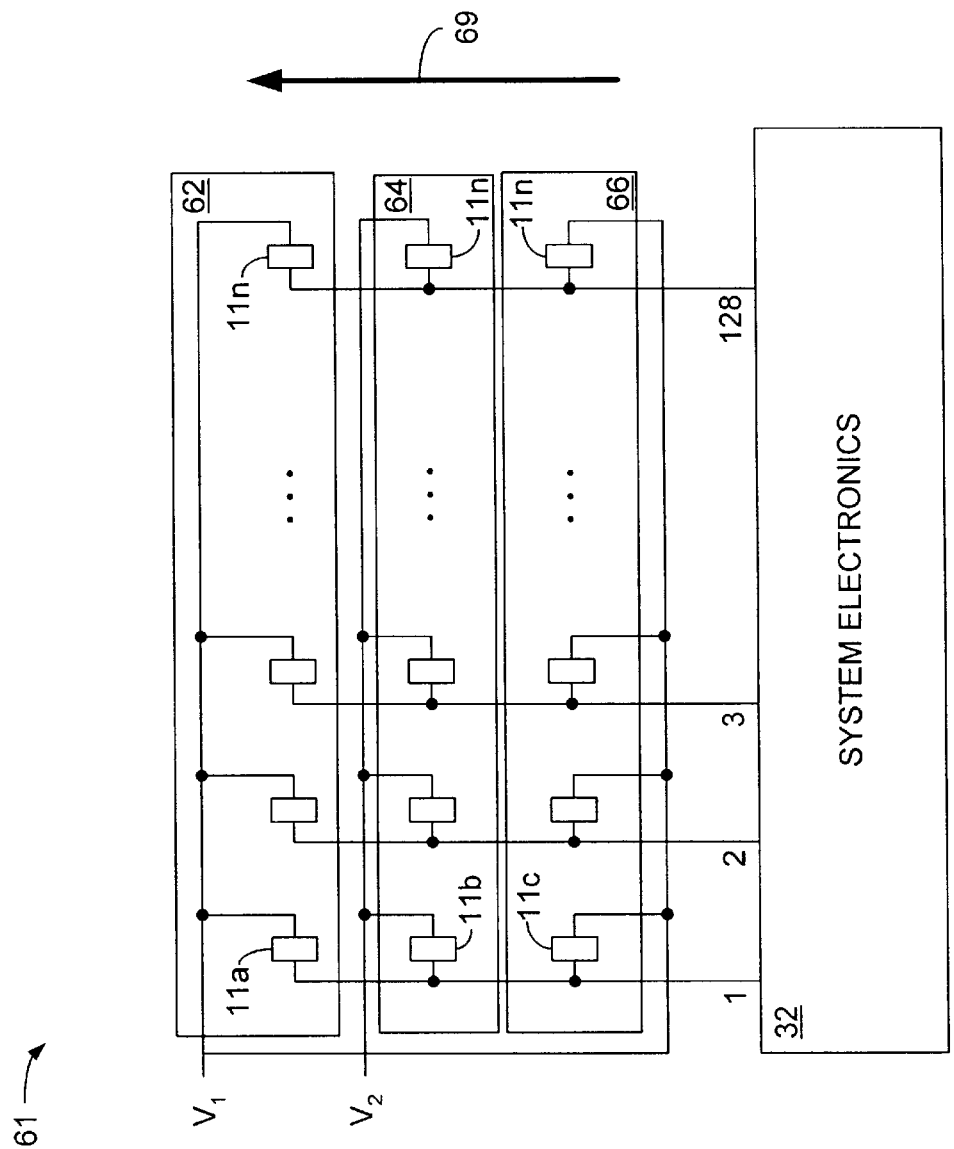
FIG. 5A is a schematic view illustrating yet another aspect of the invention in which a transducer array is controlled by voltage sources.

FIG. 5A is a schematic view illustrating yet another aspect of the invention in which transducer array 61 is controlled by voltage sources. Transducer array 61 includes transducer element row 62, transducer element row 64 and transducer element row 66. Each transducer element row includes a plurality of MUT elements 11. Illustratively, 128 MUT elements reside in each transducer element row, however, many more MUT elements may reside in each transducer element row. Furthermore, for simplicity, only three transducer element rows are depicted in FIG. 5A, however, any number of transducer element rows may be implemented. The elevation direction is indicated by arrow 69. In this aspect of the invention, voltage source $V_1$ and voltage source $V_2$ are used to selectively activate the MUT elements 11 in transducer element rows 62, 64, and 66. Together with signals supplied by system electronics 32 on lines 1 through 128, voltage source $V_2$ can be used to selectively activate the MUT elements 11 in transducer element row 64, and voltage source $V_1$ can be used to selectively activate MUT elements 11 in transducer element rows 62 and 66. Furthermore, voltage sources $V_1$ and $V_2$ can activate simultaneously all transducer element rows 62, 64, and 66. In this manner, the ultrasonic signal resulting in the depth of interest referred to in FIG. 4C can be achieved.

In this manner apodization and the effective aperture of a transducer may be dynamically varied in a continuous manner, thus allowing a smooth transition from curve 53 to curve 55 of FIG. 4C.

Figure 5B:
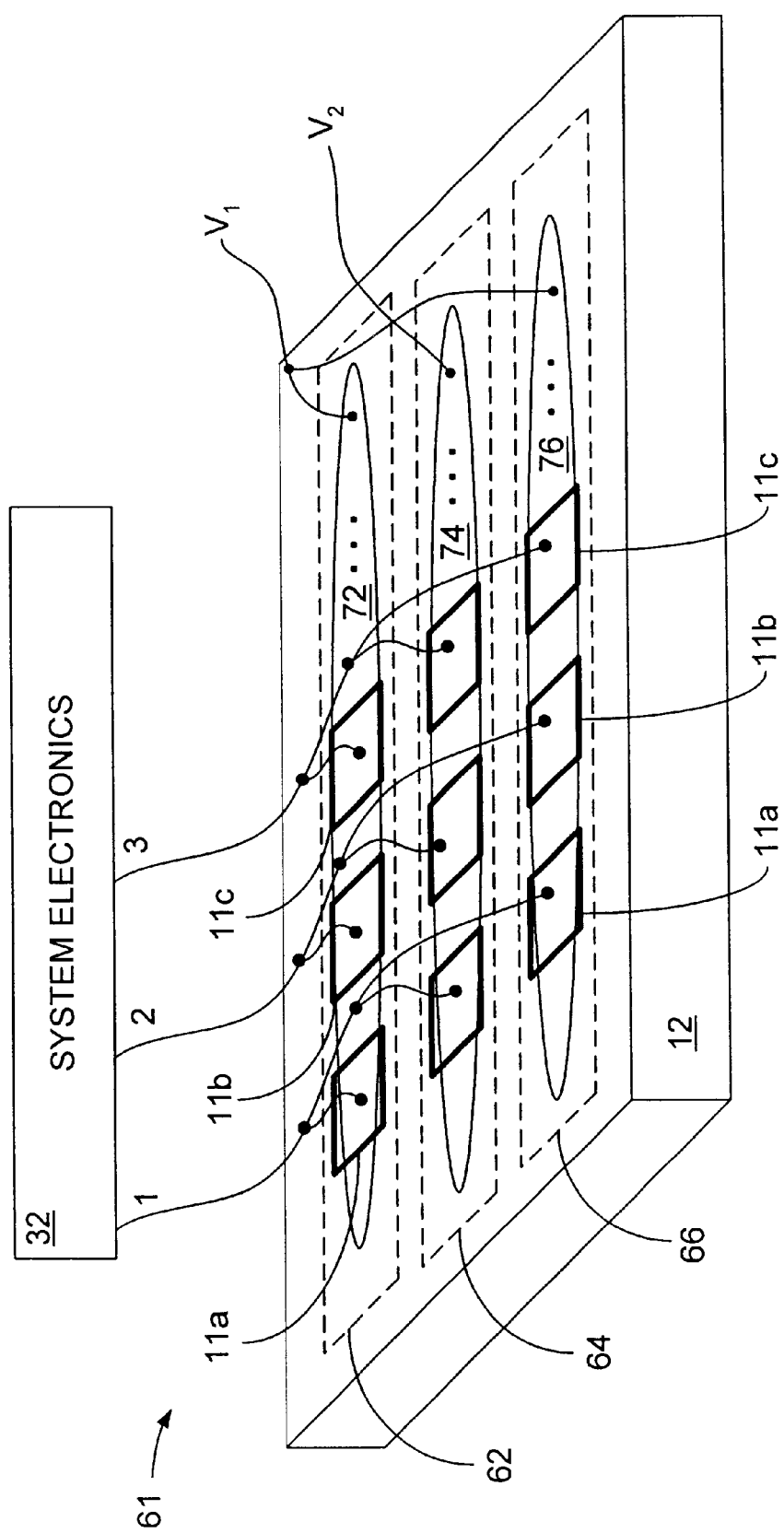
FIG. 5B is a perspective view of the transducer array of FIG. 5A.

FIG. 5B is a perspective view of the transducer array 61 of FIG. 5A. As can be seen, transducer element rows 62, 64, and 66 reside on substrate material 12. Furthermore, doped regions 72, 74 and 76, respectively corresponding to transducer element rows 62, 64, and 66 are created within substrate 12. These doped regions allow voltage sources $V_1$ and $V_2$ to supply the appropriate biasing voltages to MUT elements 11 and may be either p-doped or n-doped. In this manner, the control apparatus 25 of FIG. 1 effectively comprises voltage sources $V_1$ and $V_2$ and doped regions 72, 74, and 76 corresponding to transducer element rows 62, 64, and 66, all created on the same substrate 12.

The aspect of the invention depicted in FIGS. 5A and 5B can also be used to control the apodization of transducer array 61. Apodization control refers to the concept of varying the gain of each MUT array 11 in a manner which allows different regions of the transducer array to produce signals of varying power and shape. By varying the gain of MUT elements 11, various acoustic beams can be formed. In this manner, voltage sources $V_1$ and $V_2$ can be used not only to control elevation as described above, but can also be used to selectively vary the gain to MUT elements 11 in transducer element rows 62, 64, and 66 in order to control apodization in transducer array 61.

Figure 6B:
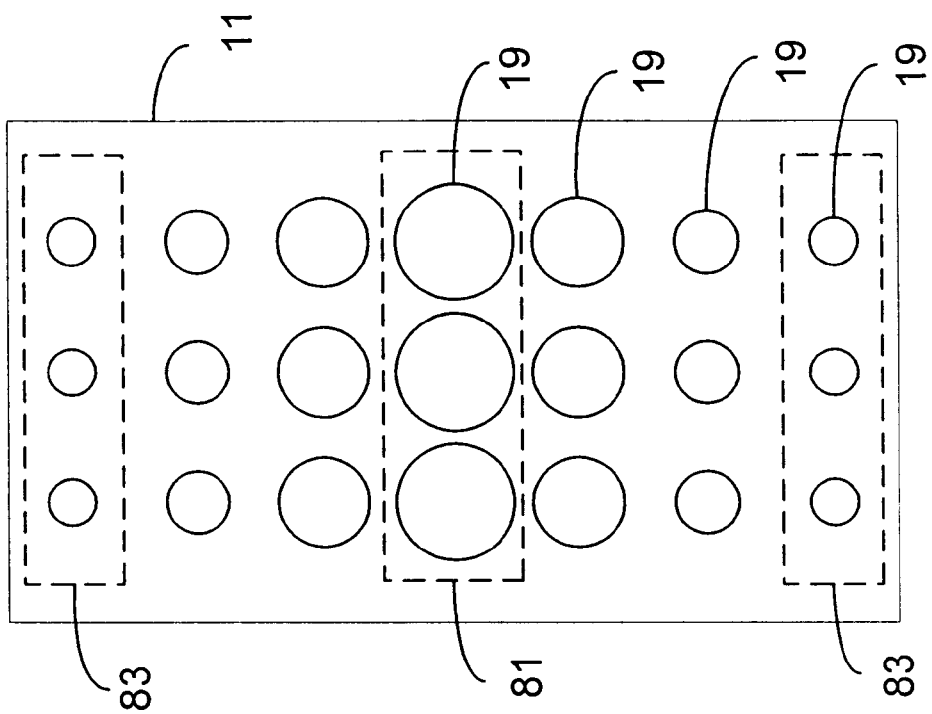
FIGS. 6A and 6B are schematic views collectively illustrating another aspect of the invention in which the MUT element of FIG. 1 contains MUT cells that can be configured to control apodization in a transducer array.
Figure 6A:
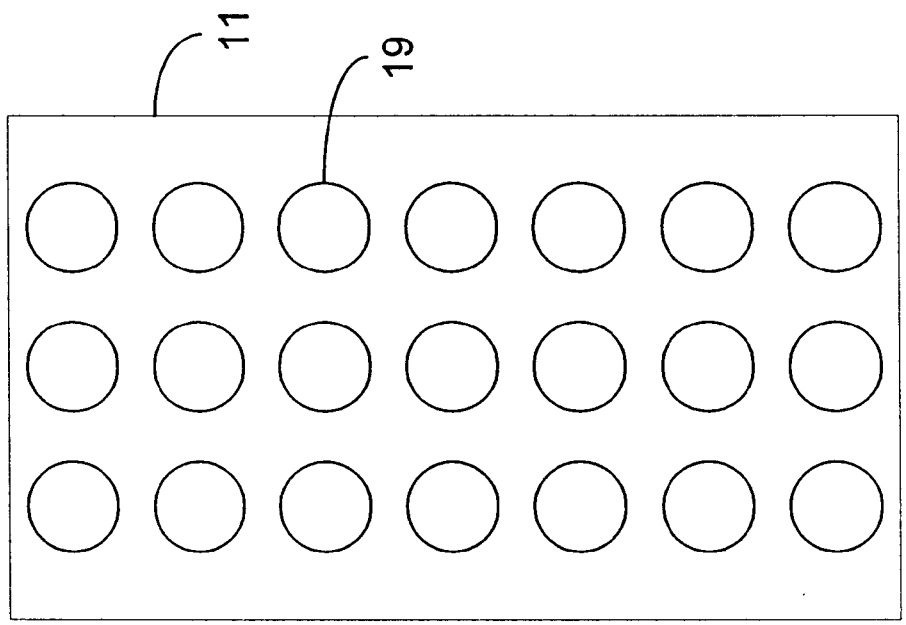

FIGS. 6A and, 6B are schematic views collectively illustrating another aspect of the invention in which MUT element 11 of transducer array 31, 41, 51, or 61 above contains MUT cells that can be configured, electrically or manually, to control apodization in a transducer array.

FIG. 6A specifically illustrates MUT element 11 including a plurality of MUT cells 19. As can be seen, each MUT cell 19 (corresponding to MUT cell 19 of FIG. 1) is of the same physical dimension. This illustrates MUT element 11 having a uniform gain because each MUT cell 19 produces the same amount of acoustic energy, thereby leading to MUT element 11 having a uniform gain across its surface. In a variation to this aspect of the invention, the voltage sources described with reference to FIGS. 5A and 5B may be used to vary the voltage to MUT cells 19, thereby resulting in a non-uniform gain across MUT element 11. In addition, the gain of MUT element 11 may be varied by varying the voltage applied thereto, thus resulting in the ability to vary the gain of MUT element 11. Furthermore, each MUT element 11 in an array may have a different gain, thus providing precise control over lateral aperture, elevation aperture and apodization. Another manner in which the gain of MUT element 11 may be varied is by changing the physical size of each MUT cell 19, by varying the distance between each MUT cell 19, or by a combination thereof.

FIG. 6B is a schematic view illustrating MUT element 11 having MUT cells 19 constructed in accordance with another aspect of the invention which allows MUT element 11 to have non-uniform gain across its surface. As can be seen, MUT elements 19 are of differing physical sizes. In this manner, the gain of MUT element 11 can be controlled because larger MUT cells 19 will produce greater acoustic energy than smaller MUT cells 19. In the example shown in FIG. 6B, the center row 81 of MUT cells has the highest gain (because the MUT cells 19 are larger, thereby providing greater acoustic energy) with the gain diminishing as the edges of the transducer element 11 are approached, with outer, or peripheral, rows 83 having the least amount of gain (because the MUT cells 19 located there are smaller than those located toward the center of MUT element 19). In this manner, the apodization of MUT element 11 may be controlled.

In another aspect of the invention, the configuration illustrated with respect to FIGS. 5A and 5B can also be used to control the gain of MUT elements 11. As described above, by controlling voltage sources V1 and $V_2$ of FIGS. 5A and 5B, the gain of transducer element rows 62, 64, and 66 can be varied, thus providing another manner in which the apodization of the transducer array may be controlled.

Figure 7A:
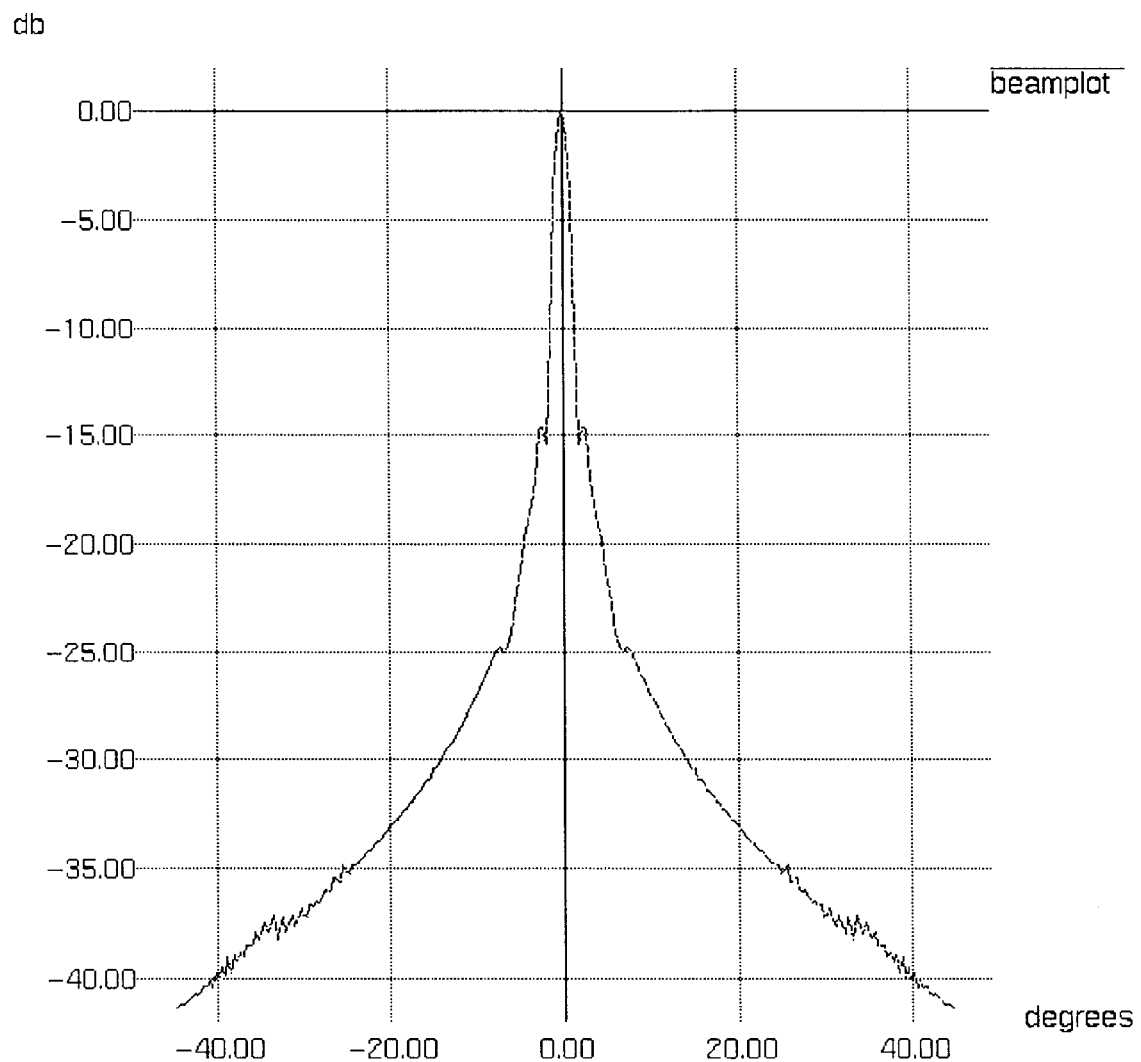
FIG. 7A is a graphical representation of a beam plot of a transducer array in which no apodization control is provided.

FIG. 7A is a graphical representation of a beam plot of a transducer array in which no apodization control is provided. As can be seen, there is significant energy in the area of the beam plot closest to the focal point (as illustrated by the significant energy present at 0°). Also note that as the scan angle increases, the acoustic beam contour is such that there is a significant off axis signal energy beyond approximately 10° from beam center and increasing with the angle away from beam center. This energy can produce image artifacts.

Figure 7B:
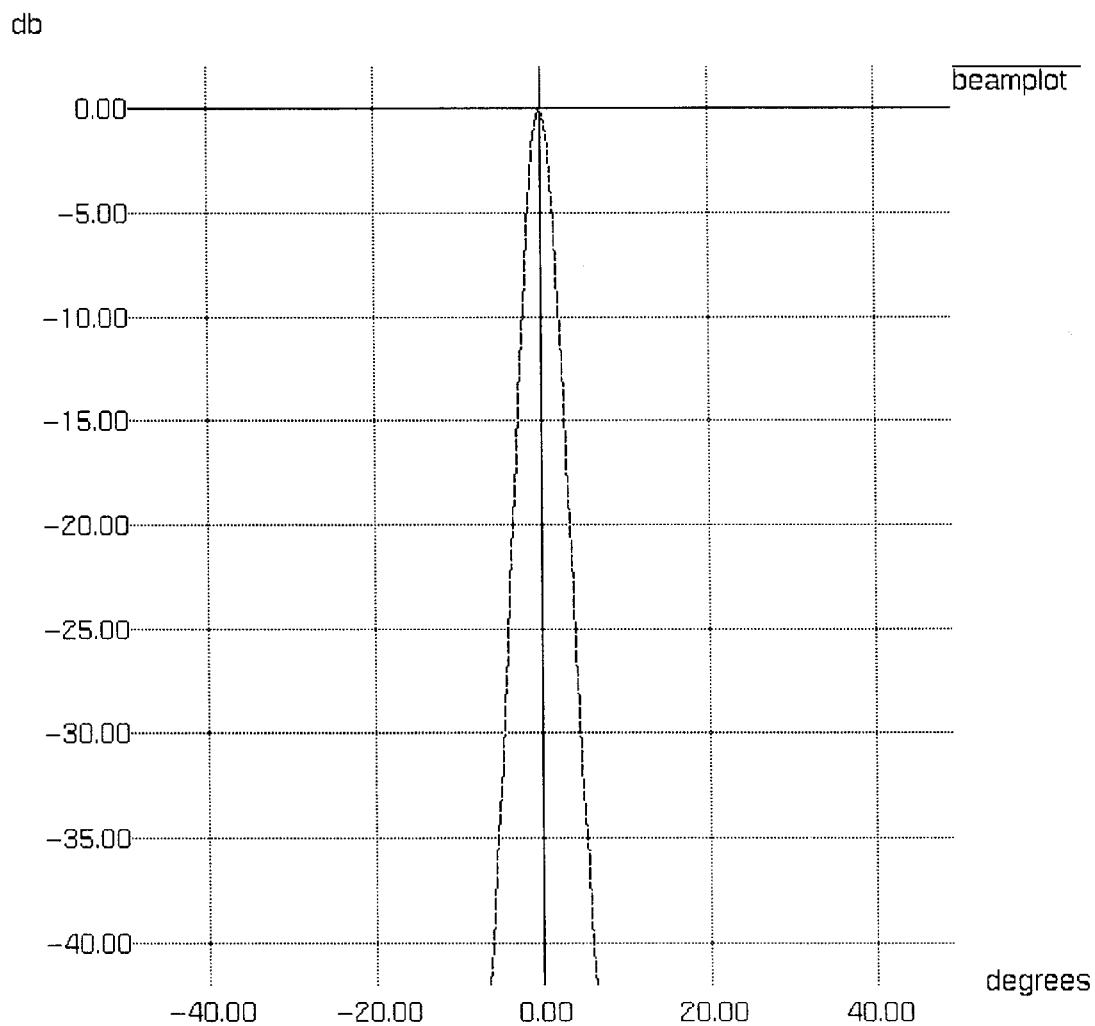
FIG. 7B is a graphical representation of a beam plot of a transducer array in which apodization control is provided.

FIG. 7B is a graphical representation of a beam plot of a transducer array in which apodization control is provided. As can be seen, the beam plot of FIG. 7B shows the majority energy in the region of 0° with very little signal energy off axis resulting in fewer image artifacts.

It should be appreciated that the graphical representations of FIGS. 7A and 7B were taken using specific transducer elements and components, and it should be understood that the graphs may vary without departing from the scope of the present invention.

It will be apparent to those skilled in the art that many modifications and variations may be made to the preferred embodiments of the present invention, as set forth above, without departing substantially from the principles of the present invention. For example, the present invention can be used to control micro-machined ultrasonic transducers with switches, relays, or other apparatus located on the same substrate as the transducer element, or by voltage sources applied to the elements. All such modifications and variations are intended to be included herein within the scope of the present invention, as defined in the claims that follow.

What is claimed is:

1. A micro-machined ultrasonic transducer (MUT) array, comprising:
    at least one MUT element, said MUT element including at least one MUT cell, said at least one MUT cell formed on a substrate;
    control means, located on said substrate and associated with said MUT element, for controlling said MUT array, wherein said control means further comprises a switching element; and
    wherein said switching element is a field effect transistor (FET).

2. The MUT array of claim 1, wherein said switching element is a micro-machined relay.

3. A micro-machined ultrasonic transducer (MUT) array, comprising:
    at least one MUT element, said MUT element including at least one MUT cell, said at least one MUT cell formed on a substrate;
    control circuitry associated with said MUT element, said control circuitry configured to supply a bias voltage to said MUT element; and
    wherein said control circuitry further comprises a voltage source and decoupling circuitry located between said MUT element and said voltage source.

4. The MUT array of claim 3, wherein said control circuitry further comprises a plurality of voltage sources, each of said plurality of voltage sources configured to supply a voltage to said MUT element wherein a plurality of MUT elements comprise said array, each of said plurality of MUT elements including a plurality of MUT cells, each MUT cell having a different gain, thereby allowing varied gain over said MUT element.

5. The MUT array of claim 3, wherein said control circuitry further comprises a plurality of voltage sources, each of said plurality of voltage sources configured to supply a voltage to said MUT element thereby controlling a gain of said MUT element.

6. The MUT array of claim 5, wherein a plurality of MUT elements comprise said array, each of said plurality of MUT elements having a different gain.

7. A method for controlling a micro-machined ultrasonic transducer (MUT) array, the array including at least one MUT element, the MUT element including a plurality of MUT cells, the method comprising the step of:

varying a gain of each MUT cell such that the gain of MUT cells located toward a center of said MUT element is greater than the gain of said MUT cells located toward a periphery of said MUT element.

8. The MUT array of claim 7, wherein said gain is varied by varying a diameter of at least two of said MUT cells.

9. The MUT array of claim 7, wherein said gain is varied by varying the spacing between at least two of said MUT cells.

10. A micro-machined ultrasonic transducer (MUT) array, comprising:

at least one MUT element, said MUT element including a plurality of MUT cells, each of said plurality of MUT cells having a variable gain, such that the gain of MUT cells located toward a center of said MUT element is greater than the gain of said MUT cells located toward a periphery of said MUT element.

11. The MUT array of claim 10, wherein at least two of said plurality of MUT cells have a different diameter.

12. The MUT array of claim 10, wherein at least two of said plurality of MUT cells are non-uniformly spaced.

13. A method for controlling a micro-machined ultrasonic transducer (MUT) array, the MUT array including at least one MUT element formed on a substrate, the MUT element including at least one MUT cell, the method comprising the steps of:

forming control means on said substrate, said control means associated with said at least one MUT element;

selectively energizing said at least one MUT element in said array by activating said control means; and energizing said control means in order to control an aperture of said MUT array.

14. The method of claim 13, further comprising the step of energizing said control means in order to control an elevation of said MUT array.

15. The method of claim 13, further comprising the step of energizing said control means in order to control the apodization of said MUT array.

16. The method of claim 13, wherein said control means further comprises a switching element.

17. The method of claim 16, wherein said switching element is a field effect transistor (FET).

18. The method of claim 16, wherein said switching element is a micro-machined relay.

19. A method for controlling a micro-machined ultrasonic transducer (MUT) array, the MUT array including at least one MUT element, each MUT element including a plurality of MUT cells, the method comprising the steps of:

forming said MUT element on a substrate;

supplying a bias voltage to said MUT element in order to control an acoustical profile of said MUT element; and adjusting a gain of said MUT element by applying a plurality of voltage sources to said MUT element.

20. The method of claim 19, wherein a plurality of MUT elements in said MUT array are controlled so that a different gain is applied to each said MUT element.

21. The method of claim 19, further comprising the step of applying a plurality of bias voltage sources, each of said plurality of bias voltage sources configured to supply a bias voltage to said MUT element, wherein a plurality of MUT elements comprise said array, each of said plurality of MUT elements including a plurality of MUT cells, each MUT cell having a different gain, thereby varying the gain over said MUT element.

* * * * *